3,406,211
MANUFACTURE OF HEXACHLOROBENZENE
AND PENTACHLOROBENZENE BY THE
CHLORINATION OF BENZENE
Leonhard Tiganik, Skoghall, Sweden, assignor to Udde-
holms Aktiebolag, Uddeholm, Sweden, a company of
Sweden
No Drawing. Filed May 17, 1965, Ser. No. 456,524
Claims priority, application Sweden, May 26, 1964,
6,377/64
6 Claims. (Cl. 260—650)

It is known to produce a mixture of high-chlorinated chlorobenzenes by the conventional chlorination process comprising introducing chlorine into liquid benzene. However, pentachlorobenzene occurs in a very low quantity in said mixture.

It is also known to transform benzene into monochlorobenzene by a so-called oxy-chlorination process according to the reaction:

Copper chloride supported by a porous carrier may be used as catalyst. The incorporation of additional chlorine atoms into the benzene nucleus by analogous reactions involves difficulties, because of the fact, for instance, that the velocity of the reaction is reduced as the degree of chlorination increases. Therefore the temperature must be increased, and this results in a combustion resulting in a loss of benzene.

It is the object of the invention to provide a process making it possible to produce pentachlorobenzene and hexachlorobenzene in a high yield by chlorinating benzene in one single operation or step. The method of the invention is characterized in that a gaseous mixture containing benzene, hydrogen chloride and oxygen and/or air is passed through a catalyst consisting of copper chloride and a chloride of at least one of the metals silver, palladium and platinum, the catalyst being supported by a carrier consisting of activated alumina. The reaction shall be carried out at an increased temperature, preferably above 300° C.

Hexachlorobenzene will be produced according to the reaction:

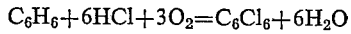

This reaction produces a large quantity of heat, and consequently the temperature may be too high in a stationary catalyst bed. Therefore we prefer to operate in a fluidized bed. It is a difficulty in a fluidized bed that the grandular carrier consisting of activated alumina has a comparatively low strength, resulting in the grains being easily abraded or broken. We have found that the hardness of the grains can be increased satisfactory if the catalyst contains boron. The boron is preferably added as boric acid when the carrier is impregnated with a solution of the catalyst.

An inert gas such as nitrogen is preferably admixed into the gaseous mixture, in order to keep down the temperature in the catalyst bed. This is preferably done by using air as oxygen-containing gas. The air should preferably be added in some excess, preferably an excess of at least 25%, to produce with certainty an oxidizing atmosphere in the reaction zone. The term excess means in this specification the excess over the quantity which would be theoretically required for transforming the entire quantity of benzene into hexachlorobenzene.

The ratio of hexachlorobenzene to pentachlorobenzene in the reaction product may be varied by varying the quantity of catalyst on the carrier. If, for instance, it is desired to produce hexachlorobenzene having a low content of pentachlorobenzene the quantity of catalyst should preferably amount to 2–4 percent by weight of the carrier. If a reaction product which a comparatively high content of pentachlorobenzene is desired the quantity of catalyst should be decreased, preferably to a quantity of 0.3–1 percent by weight of the carrier. In both cases the quantity of catalyst is given as copper.

The quantity of chloride of silver, palladium or platinum should preferably be 2–6 percent of weight of the copper chloride, the higher value preferably being chosen if a substantially pure hexachlorobenzene is desired.

The hydrogen chloride should preferably be added in some excess, preferably an excess of at least 25%. A high quantity of hydrogen chloride promotes the formation of hexachlorobenzene. Consequently, hydrogen chloride may be added in an excess of 50% or more if it is desired to produce mainly hexachlorobenzene. A high excess of hydrogen chloride, a high content of catalyst on the carrier, and a long reaction time results in a reaction which produces almost only hexachlorobenzene.

The carrier shall consist of activated alumina. The term activated alumina relates to the porous form of alumina which is usually produced by heating aluminum hydrate to drive off most of its water content. The activated alumina is a well-known commercial product which has a vast use, for instance for the drying of gases. A strong heating of the activated alumina makes its less useful or useful for the reaction according to the invention. It will become entirely unuseful if heated for a short time to 1500° C. The activated alumina is crushed to the desired grain size and is impregnated with an aqueous solution of salts of the metals to be contained in the catalyst. If a boron-containing catalyst is desired, for increasing the hardness of the alumina grains, boric acid is preferably added to said impregnating solution.

Example 1

120 grams cupric chloride was dissolved in hot water and the solution was filtered. 2.4 grams palladium chloride was dissolved in 5 milliliters concentrated hydrochloric acid, and this solution was added to the cupric chloride solution. The combined solution was diluted to a volume of 500 milliliters, and 6 grams boric acid was subsequently added.

350 milliliters granular activated alumina having a particle size of 0.2–0.3 milliliters was added to said solution. The mixing vessel was kept at a vacuum for 15 minutes and was frequently shaken. Subsequently the mixing vessel was kept at normal pressure for 15 minutes and was shaken every minute. The solution was then filtered, and the impregnated alumina was dried at 110° C. for 12 hours. The finished dry catalyst contained 3.5 percent by weight copper, defined as metal.

The catalyst thus prepared was introduced into a vertical tube having an inner diameter of 29 millimeters and a porous bottom. The catalyst was pre-heated by air having been heated to 350–360° C., introduced through the porous bottom. Subsequently a gaseous mixture of benzene, hydrogen chloride and air was introduced through the porous bottom after having been pre-heated to approximately 100° C. The quantity of the gaseous mixture was so chosen that 6.2 milliliters benzene (defined as liquid benzene), 15 liters hydrogen chloride, and 32 liter air flowed through the catalyst in one hour. Hydrogen chloride was present in an excess of 50%, and air in an excess of 30%. The residence time of the gas in the reaction zone was approximately 15 seconds. The temperature in the catalyst bed was 350–360° C.

An analysis of the reaction gas revealed that approximately 80% of the benzene had been transformed into hexachlorobenzene, approximately 4% into pentachlorobenzene, approximately 1% into perchlorethylene, whereas approximately 15% had been combusted to form carbon dioxide.

Example 2

60 grams cupric chloride was dissolved in hot water and the solution was filtered. 1.2 grams palladium chloride was dissolved in 5 milliliters concentrated hydrochloric acid, and this solution was added to the cupric chloride solution. Now 5 grams boric acid was added and an additional quantity of hydrochloric acid to increase the acidity of the solution, after having been diluted to 1 liter, to 0.5-normal.

This solution was used for impregnating 350 milliliters granular activated alumina as described in Example 1. The finished dry catalyst contained 0.75 percent by weight copper, defined as metal.

This catalyst was used for the chlorination of benzene as described in Example 1, but the quantity of hydrogen chloride was decreased from 15 to 13.5 liter per hour. The reaction product consisted of 30% hexachlorobenzene, 30% pentachlorobenzene, 10% tetrachlorobenzene, whereas the residue consisted of carbon dioxide and lower chlorinated chlorobenzenes.

The yield of pentachlorobenzene was considerably higher than in Example 1. This was due to the higher activity in the catalyst solution, the lower copper content in the finished catalyst, and the lower content of hydrogen chloride in the gas.

What is claimed is:

1. In the method of chlorinating benzene to produce penta- and hexachlorobenzene which comprises passing a gaseous mixture consisting essentially of benzene, hydrogen chloride and oxygen in contact with copper chloride, supported on a carrier, as a catalyst at a temperature of at least 300° C., the improvement which consists in including in the catalyst at least one of the metal chlorides selected from the group consisting of the chlorides of silver, palladium and platinum.

2. The improved method defined in claim 1 for the manufacture of hexachlorobenzene having a comparatively low content of pentachlorobenzene in which the quantity of catalyst is 2–4 percent by weight of the carrier.

3. The improved method defined in claim 1 for the manufacture of hexachlorobenzene having a comparatively high content of pentachlorobenzene, in which the quantity of catalyst is 0.3–1 percent by weight of the carrier.

4. The improved method defined in claim 1, in which the quantity of chloride of said metal of said group is 2–6 percent by weight of the copper chloride.

5. The improved method defined in claim 1 in which the gaseous mixture consists of benzene, hydrogen chloride and air.

6. The improved method defined in claim 1, characterized in that the gaseous mixture contains hydrogen chloride in an excess of at least 25% over the quantity which would theoretically have been required.

References Cited

UNITED STATES PATENTS

| | | | |
|---|---|---|---|
| 2,112,387 | 3/1938 | Sweeney et al. | 252—432 |
| 2,125,743 | 8/1938 | Sweeney et al. | 252—432 |
| 2,161,984 | 6/1939 | Sweeney et al. | 252—432 XR |
| 2,838,577 | 6/1958 | Cook et al. | |
| 2,952,721 | 9/1960 | Thomas et al. | 252—432 XR |
| 2,827,502 | 3/1958 | Loeser et al. | 260—650 |
| 2,950,329 | 8/1960 | Reicheneder et al. | 260—650 |
| 3,159,455 | 12/1964 | Skaperdas et al. | |
| 2,866,830 | 12/1958 | Dunn et al. | 260—650 |

FOREIGN PATENTS

| | | |
|---|---|---|
| 968,933 | 9/1964 | Great Britain. |

BERNARD HELFIN, *Primary Examiner.*

H. MARS, *Assistant Examiner.*